Figure 1:
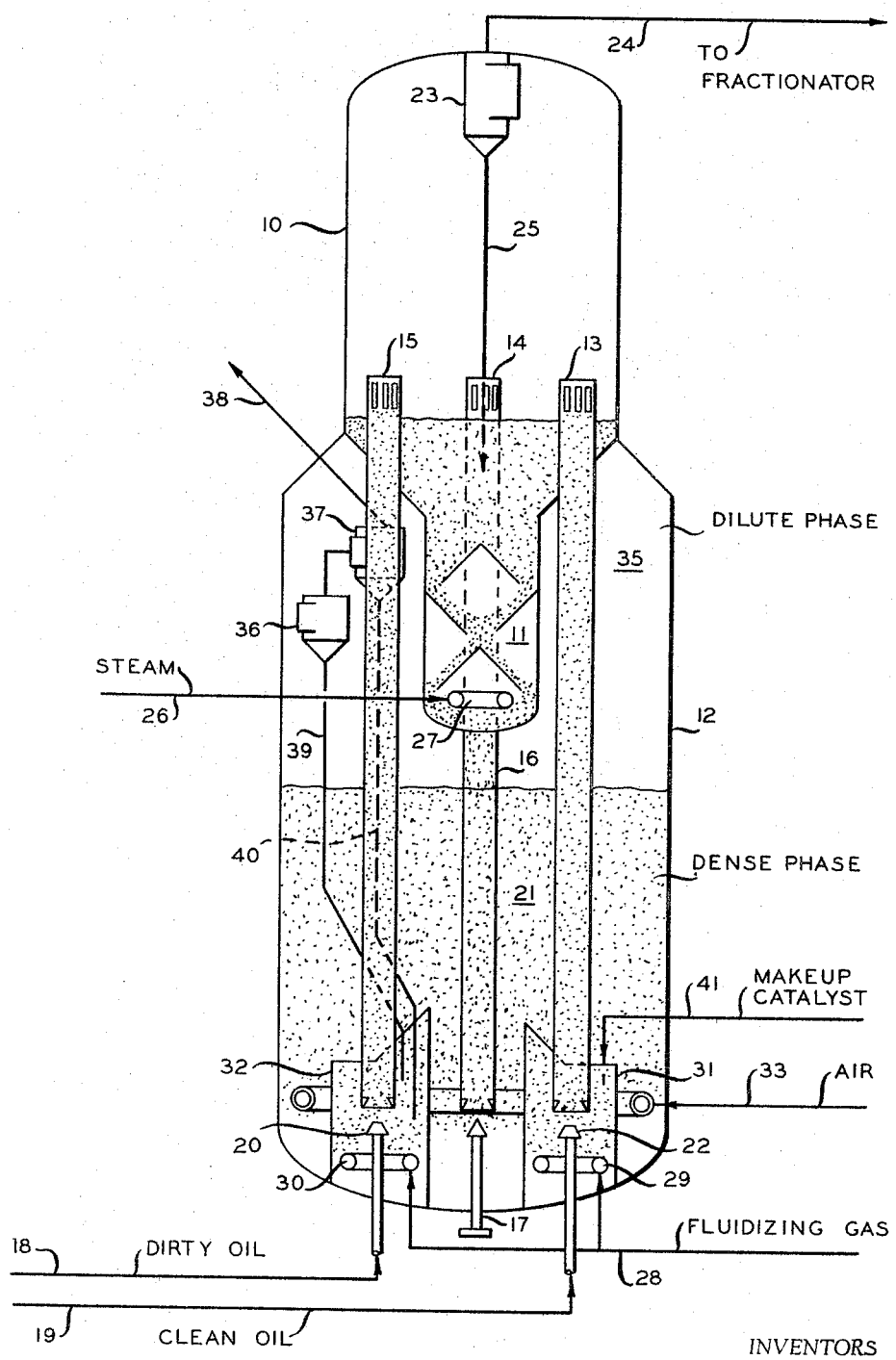

Feb. 21, 1967  R. M. WALDBY ETAL  3,305,475
VAPOR-SOLIDS CONTACTING OF DIRTY AND CLEAN MINERAL OILS
Filed Dec. 16, 1963  3 Sheets-Sheet 1

INVENTORS
R. M. WALDBY
J. H. ENGEL
BY Young and Quigg
ATTORNEYS

United States Patent Office 3,305,475
Patented Feb. 21, 1967

3,305,475
VAPOR-SOLIDS CONTACTING OF DIRTY AND
CLEAN MINERAL OILS
Roy M. Waldby, Berkeley Heights, N.J., and John H. Engel, Sweeny, Tex., assignors to Phillips Petroleum Company, a corporation of Delaware
Filed Dec. 16, 1963, Ser. No. 330,924
5 Claims. (Cl. 208—78)

This invention relates to the contacting of vapors with finely-divided solids maintained in the form of a fluidized bed of solids. In one aspect this invention relates to the catalytic cracking of hydrocarbons in the presence of a fluidized bed of solid catalyst so as to convert the hydrocarbons into more valuable products. In another aspect the invention relates to a method and means for reducing the over-all contaminating metal content of a fluidized solid catalyst bed. In still another aspect the invention relates to a method and means for controlling the characteristics of catalyst which contacts separate streams of hydrocarbons in a process utilizing a fluidized solid catalyst bed that is common to the various hydrocarbon streams.

It is known to crack hydrocarbon fluids catalytically to increase the quantity and quality of the gasoline or motor fuel produced utilizing a fluidized bed of finely-divided solid catalyst particles. It is also known to employ two or more separate cracking zones wherein feed stocks containing differing concentrations of contaminating metals are separately cracked in the presence of separate solid catalyst beds containing different amounts of contaminating metals. It has been proposed to utilize a fluidized bed of solid catalyst in a common regeneration zone and to introduce similar or different hydrocarbon streams into separate riser-reactors positioned in the dense phase of the fluidized bed in the regeneration zone so that catalyst is entrained in the hydrocarbon streams passing through the riser-reactors. The mixture of vapors and catalyst solids emerges from the riser-reactors into a disengaging zone from whence the vapors are recovered as products of the process and the solids are returned to the regeneration zone. Such process provides some flexibility in operation in that the separate hydrocarbon streams can be contacted with the catalyst at different temperatures and for differing periods of time but there is no control over the characteristics of the catalyst because the catalyst is derived from a common catalyst bed for each of the various riser-reactors.

According to the present invention, catalyst fines in the regeneration zone are concentrated and passed to an area in the dense phase of the regeneration zone adjacent one or more of the riser-reactors so that the catalyst entrained in such riser-reactor contains a relatively high concentration of catalyst fines. We have found that the catalyst fines contain a much higher contaminating metal content than that of the equilibrium circulating catalyst bed as a whole. Thus, in a hydrocarbon cracking reaction the concentrated fines can be returned to the catalyst bed at an area adjacent the riser-reactor into which topped crude or other feed stream containing a high concentration of contaminating metals is introduced. Similarly, distillates and other relatively clean hydrocarbon charge streams will be contacted with catalyst having a reduced contaminating metal content as a result of withdrawing fines from the equilibrium catalyst bed. The catalyst fines are concentrated by collecting the suspended particles from the dilute catalyst phase which exists above the dense catalyst phase in the regeneration chamber. The catalyst fines are advantageously collected by exhausting the regeneration gas from the regeneration chamber through one or more cyclone separators.

In the event that dirty oil (oil containing a high concentration of contaminating metals) is present in a large volume such that the quantity of entrained catalyst is too great to develop an appreciable contaminating metal concentration difference between equilibrium catalyst and catalyst fines, a stream of regenerated equilibrium catalyst can be removed from the regeneration chamber and passed through one or more vapor-solids separating devices, such as cyclone separators, along with a conveying stream of gas such as air. The catalyst fines separated from the catalyst stream are then passed to the area of the dense catalyst phase adjacent the inlet to the dirty oil riser-reactor and the heavier catalyst particles from which the catalyst fines were removed are passed to the area of the fluidized bed adjacent the inlet to the clean oil riser-reactor. Thus the catalyst particles containing the highest concentration of contaminating metals are concentrated in that portion of the dense phase catalyst bed adjacent the inlet to the dirty oil riser-reactors.

Further, according to the invention, a stream of catalyst particles is removed from the fluidized bed adjacent the inlet to the dirty oil riser-reactor, passed through a process for removal of contaminating metals and then returned to the area of the fluidized bed adjacent the dirty oil riser-reactor.

Figure 2:
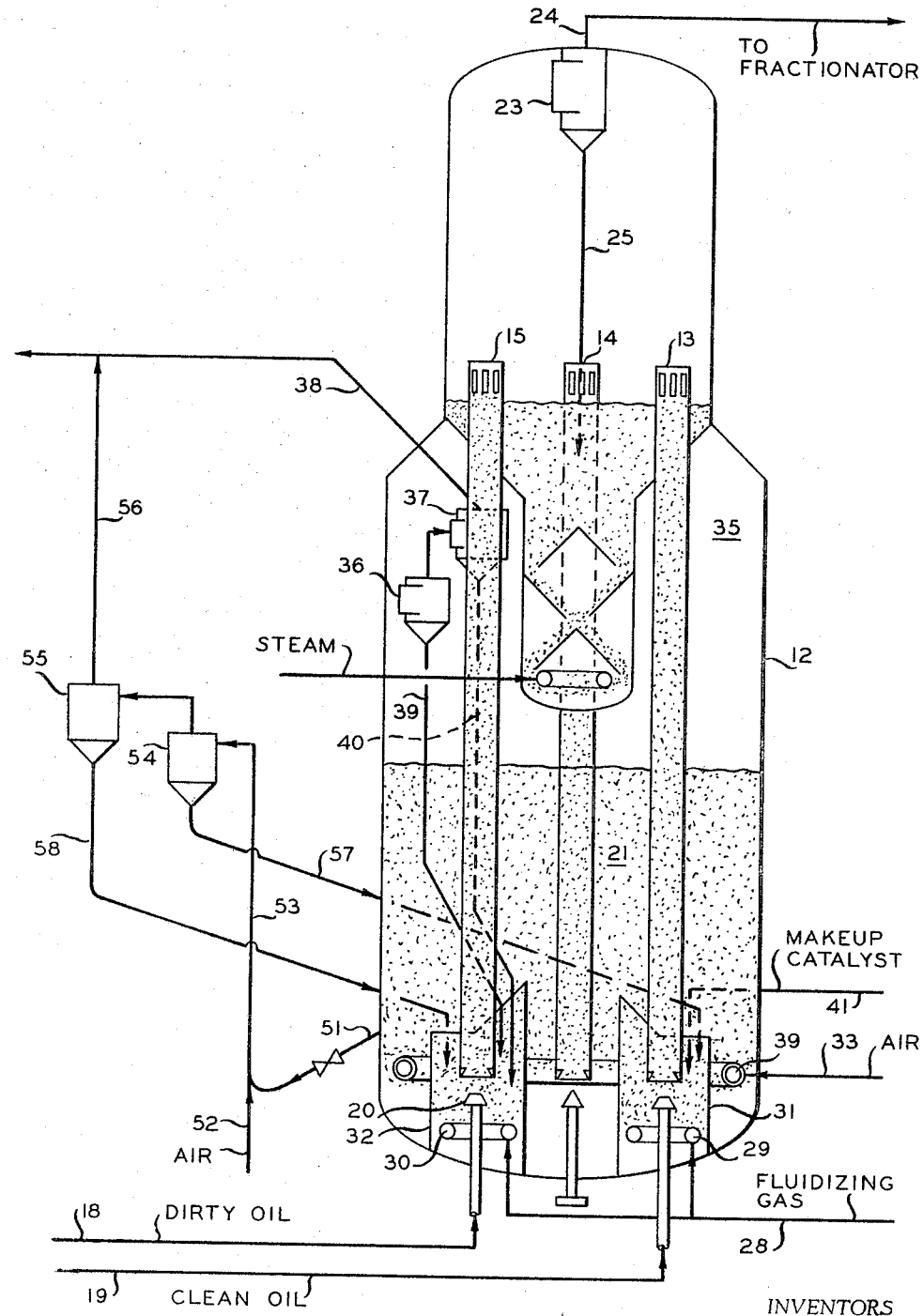
Figure 3:
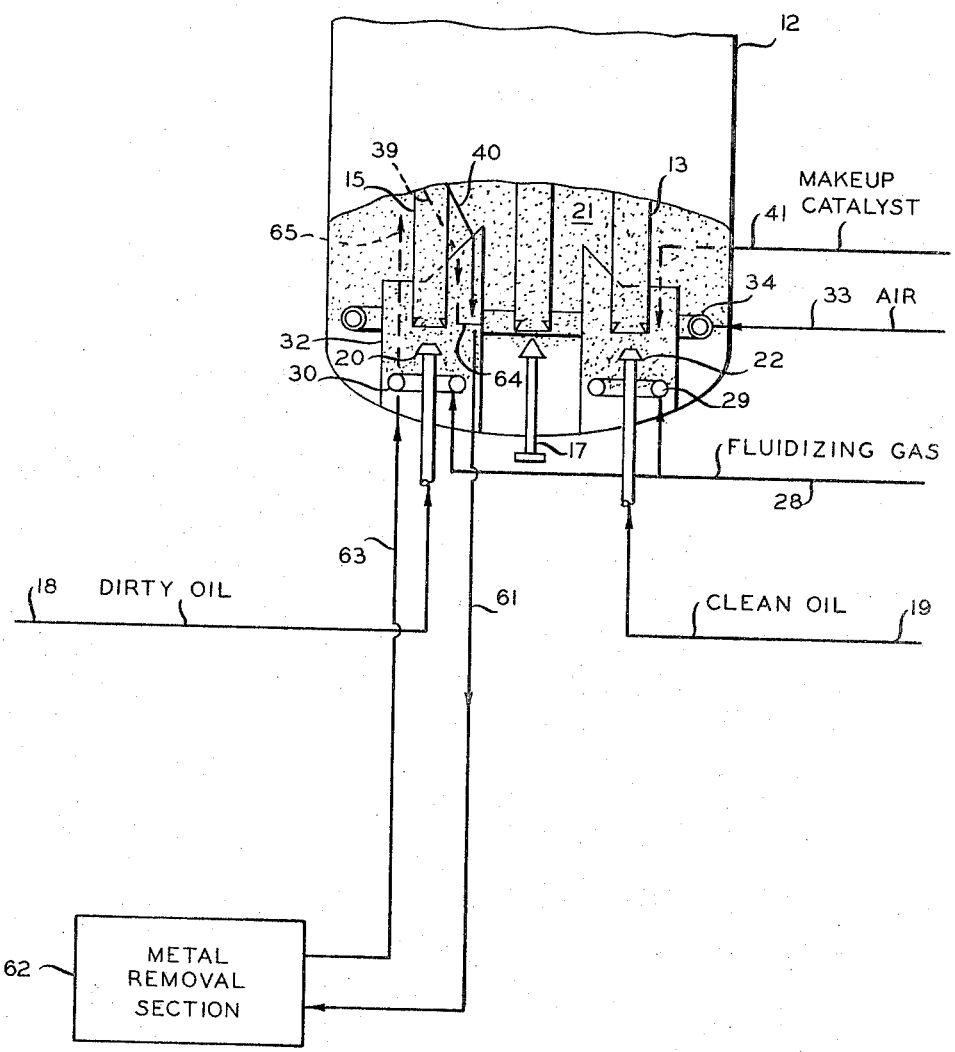

It is an object of the invention to provide a method and means for increasing the yield of liquid hydrocarbons and decreasing the yield of coke and light gases in a catalytic cracking operation wherein hydrocarbon streams of different composition are contacted with a solid catalyst derived from a common fluidized solid catalyst bed. It is also an object of this invention to provide a method and means for concentrating catalyst particles, having a high contaminating metals content, in a selected area of a fluidized catalyst bed so that the contaminating metal content of the remainder of the fluidized bed is substantially reduced. It is a further object of this invention to provide a method and means for contacting a dirty oil charge with catalyst particles containing a high concentration of contaminating metals and contacting a clean oil charge with catalyst particles having a lower contaminating metals concentration in a conversion process wherein the catalyst particles are contained in a common fluidized bed. Other objects and advantages of the invention will be apparent to one skilled in the art upon study of this disclosure including the detailed description of the invention and the appended drawing wherein:

FIGURE 1 is a sectional elevation of a catalytic cracking apparatus illustrating schematically one embodiment of the invention;
FIGURE 2 is a view of a similar apparatus including an additional embodiment of the invention; and
FIGURE 3 is an elevation, partly in section, of a portion of a catalytic cracking apparatus illustrating schematically another embodiment of the invention.

Various items of equipment not necessary for an understanding of the invention have been omitted from the drawing in order to simplify the description of the invention. Such items, which include valves, pumps, control instruments and the like, are conventional and those skilled in the art will know where inclusion of same will be advantageous.

Referring now to FIGURE 1, a catalytic cracking apparatus is illustrated having an upper reactor-disengaging chamber 10, an intermediate stripping chamber 11 and a lower regeneration chamber 12. Risers 13, 14 and 15 are provided for conveying regenerated, finely-divided catalytic material from the lower portion of the regeneration chamber 12 up to and into the reactor-disengaging chamber 10 along with the hydrocarbon charge stock. A standpipe 16 conveys stripped catalyst from the stripping chamber 11 to the lower portion of the regeneration chamber 12 and the rate of supplying stripped catalyst to the regeneration chamber 12 is controlled by vertically movable plug valve 17 which is aligned with the lower outlet end of standpipe 16. According to the invention, the conventional feed streams to the catalytic cracking apparatus, such as topped crude of conduit 18 and recycle or distillate of conduit 19, are introduced into riser-reactors 13 and 15 through vertically movable, hollow steam plug valves 20 and 22. The valve inlet to riser 14 is similar to plug valves 20 and 22 but is not shown because it is directly behind valve 17. The feed stream to riser 14 can be a dirty oil such as topped crude or can be a clean oil such as a distillate.

The hydrocarbon streams passing through conduits 18 and 19 and through valves 20 and 22 entrain catalyst particles from the dense phase fluidized solid catalyst bed 21 in their passage upward through risers 15 and 13. The vaporized hydrocarbon products are removed from disengaging chamber 10 via cyclone separator 23 and conduit 24 and passed to a product fractional distillation step (not shown). Solids removed in the cyclone separator 23 are returned to the disengaging chamber 10 via conduit 25. Steam is admitted via conduit 26 and sparge ring 27 to the stripping chamber 11 to strip residual hydrocarbons from the catalyst descending through the stripper chamber 11. A fluidizing gas, such as steam or other inert gas, is passed via conduit 28 to sparge rings 29 and 30 positioned in wells 31 and 32 in the lower portion of regeneration chamber 12 to maintain the finely-divided catalyst in the wells in a fluidized state. The wells 31 and 32 are formed of substantially vertical and cylindrical baffle members surrounding the inlets to the risers 13 and 15 so as to form an annular space therebetween. Air or other oxidizing gas is passed via conduit 33 and sparge ring 34 into the lower portion of regeneration chamber 12 to provide the oxygen required to burn the coke from the surface of the catalyst particles and thereby to regenerate the catalyst. Combustion products and fluidizing gas form a dilute catalyst phase 35 in the regeneration chamber above the dense phase 21 of the fluidized solid catalyst regeneration chamber 12. Combustion products and fluidizing gas are separated from the dilute phase 35 of the regeneration chamber 12 in cyclone separators 36 and 37 and are removed from regeneration chamber 12 via conduit 38. Catalyst fines removed from the dilute phase in cyclone separators 36 and 37 are passed into well 32 via conduits 39 and 40. The catalyst fines are thus concentrated and passed to an area of the dense phase fluidized bed 21 adjacent the catalyst inlet to riser-reactor 15 so that the dirty oil admitted via conduit 18 is contacted with catalyst having a high concentration of contaminating metal. Some catalyst fines pass through cyclone separators 36 and 37 and are removed from the system via conduit 38. Make-up catalyst, which can be new or fresh catalyst, is added to the system via conduit 41 into well 31 so that the clean oil entering via conduit 19 entrains the cleanest catalyst from well 31. Riser 14 can be utilized for processing clean oil or dirty oil or an entirely different charge stock, as the occasion dictates.

In another embodiment of the invention as shown in FIGURE 2, a stream of catalyst is withdrawn from the dense phase 21 of the catalyst of regeneration chamber 12 via conduit 51 and conveyed by a carrier gas, such as air introduced via conduit 52, through conduit 53 and thence through cyclone separators 54 and 55 which are connected in series and which exhaust the carrier gas via conduit 56 into conduit 38. Heavier catalyst particles removed in cyclone separator 54 and passed via conduit 57 to well 31 and catalyst fines separated from the carrier gas in cyclone separator 55 are passed via conduit 58 to well 32. Make-up or fresh catalyst is also passed via conduit 41 to well 31, as in FIGURE 1. Similarly, catalyst fines removed from the dilute phase 35 by cyclone separators 36 and 37 are passed via conduits 39 and 40 to well 32. Thus, catalyst particles having a relatively high contaminating metal content are further concentrated in well 32 and catalyst particles having a relatively low contaminating metal content are further concentrated in well 31.

In another embodiment of the invention, as shown in FIGURE 3, a stream of catalyst particles is removed from well 32 via conduit 61 and passed to a contaminating metal removal system indicated at 62. Catalyst particles from which contaminating particles have been removed are returned to well 32 via conduit 63 at a point apart from the point of withdrawing catalyst from well 32 for treatment in contaminating metal removal system 62. The catalyst stream withdrawn via conduit 61 is advantageously withdrawn from a second well 64 positioned within well 32 so as to receive catalyst fines from cyclone separators 36 and 37. If desired, the catalyst from which contaminating metals have been removed can be passed to the dense phase 21 outside the well 32 via conduit 65. Contaminating metals removal systems are known and are available commercially. One such system utilizes a cation exchange resin to replace contaminating metal ions with hydrogen ions.

The invention can be more readily appreciated by reference to the following example which should be considered as representative and not as unduly limiting the invention.

EXAMPLE

The feed to one riser-reactor of a fluidized catalyst cracking apparatus as illustrated in FIGURE 1 comprises topped crude (dirty oil) and the feed to another riser-reactor comprises gas oil (clean oil). Operating conditions are tabulated below:

Charge oils:
  (a) Gas oil, B/D _____ 20,000
     ° API @ 60/60° F. _____ 26.0
     Metal contaminant, p.p.m.[1] _____ 2.5
     Temperature, ° F. _____ 450
  (b) Topped crude, B/D _____ 1,000
     ° API @ 60/60° F. _____ 19
     Metals contaminant, p.p.m.[1] _____ 252
     Temperature, ° F. _____ 500
Operating conditions—
  (a) Gas oil riser:
     Cat./oil wt. ratio _____ 9.4
     Average temp. ° F. _____ 920
     Average pressure, p.s.i.g. _____ 13
     Contact time, sec. _____ 3
     Conversion, vol. percent _____ 75
  (b) Topped crude riser:
     Cat./oil wt. ratio[2] _____ 9.4
     Average temp. ° F. _____ 910
     Average pressure, p.s.i.g. _____ 13
     Contact time, sec. _____ 3
     Conversion, vol. percent _____ 75
Regenerated catalyst:
  Temperature, ° F. _____ 1,110
  Catalyst metals content, p.p.m.[1] _____ 1,515
Dipleg catalyst:
  Metals contaminant, p.p.m.[1] _____ 8,125

[1] Measured as iron, nickel and vanadium oxides.
[2] Catalyst comprising 96 wt. percent regenerated catalyst and 4 wt. percent dipleg catalyst.

The above operation increases the production of liquid hydrocarbons based on the feed by 4 volume percent and decreases the gas production by 6 weight percent as compared to operating without segregating the dipleg catalyst, but still operating at the same conditions of temperature, pressure, flow rates, etc. The dipleg catalyst is that delivered from the cyclone separators, e.g., via conduits 39 and 40 of FIGURE 1. In the prior art this catalyst is delivered to the most convenient locus in the fluidized bed 21.

That which is claimed is:

1. The method of catalytically cracking a dirty oil stream and a clean oil stream with catalyst contained in the regeneration zone of a fluidized bed of a solid cracking catalyst wherein said catalyst is entrained by said dirty oil stream from a first well position in said regeneration zone and catalyst is entrained by said clean oil stream from a second well positioned in said regeneration zone which comprises concentrating the catalyst fines of said fluidized bed; passing said fines directly into the first well in said regeneration zone of said fluidized bed at the locus where the dirty oil stream entrains catalyst of said fluidized bed; and entraining with said clean oil stream catalyst from said second well of said fluidized bed depleted of said catalyst fines.

2. In a catalytic conversion process wherein a first stream of hydrocarbon rich in metals entrains catalyst from a first well positioned in the regeneration zone of a fluidized bed of solid cracking catalyst and a second stream of hydrocarbon poor in metals entrains catalyst from a second well positioned in said regeneration zone, the improvement comprising concentrating and removing catalyst fines from said fluidized bed; passing said concentrated fines into said first well adjacent the locus where the catalyst is entrained by said first stream of hydrocarbon; and entraining with said second hydrocarbon stream from said well catalyst from which catalyst fines have been removed.

3. In a catalytic conversion process wherein separate hydrocarbon streams containing different concentrations of contaminating metals are admixed with catalyst withdrawn from different areas of the dense phase catalyst bed of a fluidized bed catalyst regeneration zone containing a dense phase and a dilute phase and passed to a disengaging zone from which vapors are recovered as a product of the process and solid catalyst is returned to the regeneration zone, the improvement comprising collecting and removing catalyst fines from the dilute phase of said regeneration zone;
returning fines to the dense phase bed of said regeneration zone at the area from which catalyst is withdrawn and admixed with a hydrocarbon stream containing a relatively high concentration of contaminating metals;
withdrawing a stream of catalyst from said regeneration zone;
separating catalyst fines from said catalyst stream;
returning said fines to the dense phase bed of said regeneration zone at the area from which catalyst is withdrawn and admixed with a hydrocarbon stream containing a relatively high concentration of contaminating metals; and
returning the remainder of said catalyst stream to the dense phase bed of said regeneration zone at the area from which catalyst is withdrawn and admixed with a hydrocarbon stream containing a relatively low concentration of contaminating metals.

4. In apparatus for the catalytic conversion of hydrocarbons comprising a fluidized bed solid catalyst regeneration chamber containing a catalyst dense phase and a catalyst dilute phase, a catalyst disengaging chamber, first means to convey a confined stream of hydrocarbons to said disengaging chamber along with catalyst from an area of said dense phase adjacent said first means, second means to convey a stream of hydrocarbons to said disengaging chamber along with catalyst from an area of said dense phase adjacent said second means, the combination therewith of means to collect fines from said dilute phase;
means to pass collected fines to said area of said dense phase adjacent said first means;
means to withdraw catalyst from said dense phase and separate catalyst fines from the withdrawn catalyst;
means to pass catalyst fines separated from said withdrawn catalyst to said area of said dense phase adjacent said first means; and
means to pass withdrawn catalyst from which catalyst fines have been separated to said area of said dense phase adjacent said second means.

5. The apparatus of claim 4 including means to pass fresh catalyst to said area of said dense phase adjacent said second means.

References Cited by the Examiner
UNITED STATES PATENTS

| | | | |
|---|---|---|---|
| 2,382,755 | 8/1945 | Tyson | 208—55 |
| 2,488,744 | 11/1949 | Snyder | 208—113 |
| 2,891,001 | 6/1959 | Wickham et al. | 208—164 |
| 2,893,943 | 7/1959 | Vignovich | 208—74 |
| 2,941,936 | 6/1960 | Harper | 208—74 |
| 3,053,753 | 9/1962 | Slyngstad et al. | 208—164 |
| 3,135,683 | 6/1964 | Mitchell | 208—78 |

DELBERT E. GANTZ, *Primary Examiner.*

HERBERT LEVINE, *Examiner.*